United States Patent [19]

Denney

[11] 4,177,542
[45] Dec. 11, 1979

[54] HANDHOLD INSERT FOR A TWISTED ROPE

[75] Inventor: James H. Denney, Temple Terrace, Fla.

[73] Assignee: Vector Engineering Corporation, Temple Terrace, Fla.

[21] Appl. No.: 913,675

[22] Filed: Jun. 8, 1978

[51] Int. Cl.² ............................................. F16G 11/00
[52] U.S. Cl. .................................. 24/115 R; 24/122.6; 16/110 R; 16/DIG. 12
[58] Field of Search .............. 24/122.6, 129 D, 129 R, 24/115 R, 115 N, 114.5; 289/14, 13; 16/110 R, DIG. 12

[56] References Cited

U.S. PATENT DOCUMENTS

| | | | |
|---|---|---|---|
| 440,582 | 11/1890 | Bahlsen | 24/122.6 X |
| 1,197,674 | 9/1916 | Shaw | 24/114.5 |
| 3,170,753 | 2/1965 | Witte et al. | 24/122.6 X |
| 3,600,765 | 8/1971 | Rovinski et al. | 24/122.6 |
| 3,921,257 | 11/1975 | Appleby et al. | 24/122.6 |

FOREIGN PATENT DOCUMENTS 1056990 2/1967 United Kingdom ................. 24/122.6

Primary Examiner—Philip C. Kannan
Attorney, Agent, or Firm—Duckworth, Hobby, Allen & Pettis

[57] ABSTRACT

A handhold for a twisted strand rope comprising an elongated body of a length sufficiently long to span the palm of the hand of a user and of a circumference sufficient to be firmly grasped by the user's hand when the hand is closed. The outer surface of the body has a plurality of notches or grooves uniformly spaced therearound and at least equal in number to the number of strands in the rope, these notches or grooves being disposed at both ends and/or longitudinally of the body for individually holding a strand of the rope. A length of a rope equal to the length of the body is untwisted to separate the strands thereof so that the body can be inserted between the strands and each strand inserted or nested in a longitudinal groove or a corresponding pair of notches at opposite ends of the body. The body is retained within the rope by the natural tendency of the rope strands to assume their twisted orientation.

11 Claims, 11 Drawing Figures

HANDHOLD INSERT FOR A TWISTED ROPE

BACKGROUND OF THE INVENTION

People who handle rope frequently or professionally, such as watermen or the like, develop a knack for handling and pulling on rope without slippage. Obviously, the skin of such people becomes tough and the hand muscles become stronger so that they can grip the rope with greater force. In addition, they develop the knack of winding the loose portion of the rope around the wrist adjacent the rope holding hand to assist against slippage between the hand and rope.

The use of ropes for non-professional use has been increasing in the recent past including sports, such as tug-of-war, and physical development such as climbing suspended ropes, hand-over-hand, to develop muscles in the hand, arm, shoulders, neck and upper torso or chest. People involved in such usage of rope do not have the toughened hands or rope handling techniques of the professionals. Consequently, the layman or non-professional frequently has problems in gripping the ropes, even though knots may be tied in the rope to constitute handholds. Such knots are difficult to tie, especially with substantially uniform spacing, and the knots become too small when tightened to afford the desired result.

SUMMARY OF THE INVENTION

The present invention comprises a handhold for twisted strand ropes and/or such rope provided with at least one such handhold embedded in the rope by being intertwined between the strands of the rope so that there can not be any slippage between the handhold and the rope.

The handhold for a rope comprises an elongated body of a length sufficiently long to span the palm of the hand of a user and of a circumference sufficient to be firmly grasped by the user's hand when the hand is closed. The outer surface of the body has a plurality of notches or grooves uniformly spaced therearound and at least equal in number to the number of strands in the rope, these notches or grooves being disposed at both ends and/or longitudinally of the body for individually holding a strand of the rope. A length of rope substantially equal to the length of the body is untwisted to separate the strands thereof so that the body can be inserted between the strands and each strand is inserted or nested in a corresponding longitudinal groove or a corresponding pair of notches at opposite ends of the body. Though not necessary, the body and rope can be secured by whipping the rope adjacent each end of the body to preclude any further separation of the strands, or the body and strands can be surrounded by a suitable cover or grip member.

The invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
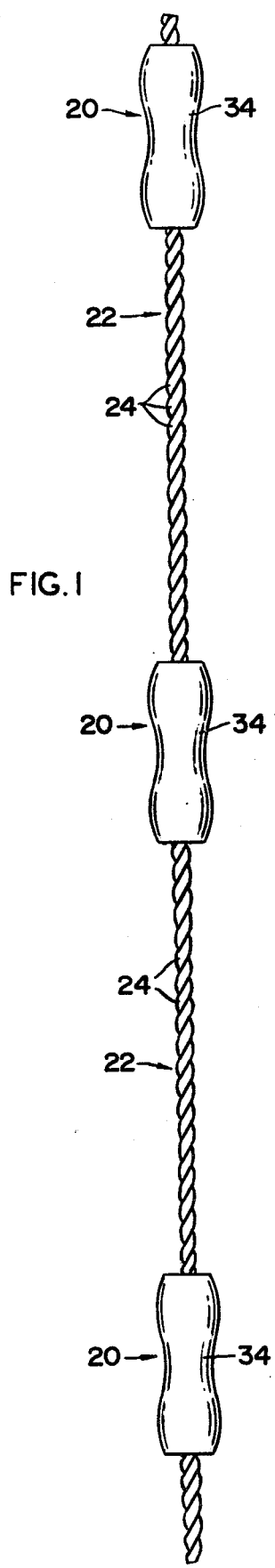
FIG. 1 is an elevational view of one form of a twisted rope and handhold according to the present invention.

Reference is first invited to the view of FIG. 1, wherein a preferred embodiment of the invention is shown as comprising a handhold generally indicated as 20 utilized in combination with a three-strand twisted rope 22. As shown therein, it may be desirable to utilize a plurality of handhold 20, and if so, they are preferably spaced at regular intervals along the length of rope 22. Rope 22 is formed from three individual strands 24, each of the strands 24 consisting of a bundle of longitudinally arranged natural or synthetic fibers twisted together in the usual manner to form a strand 24 and with the three strands 24 then twisted together to form the standard twisted rope 22.

Figure 2:
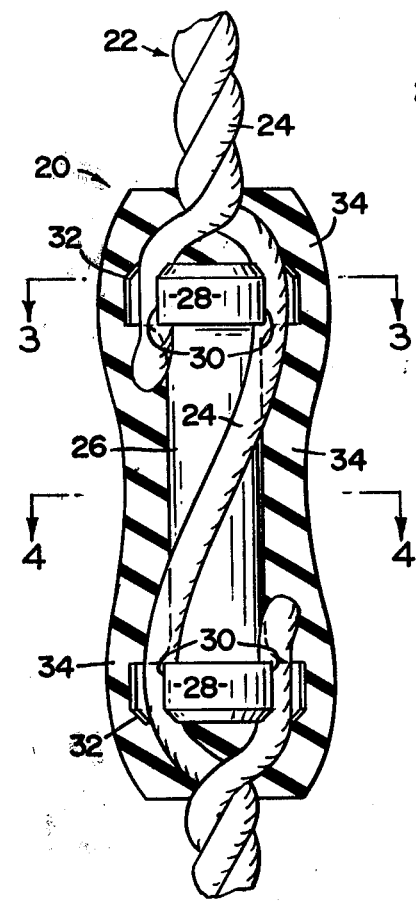
FIG. 2 is an elevational view, partially in cross-section, of a rope incorporating a handhold of the type shown in FIG. 1.
Figure 4:
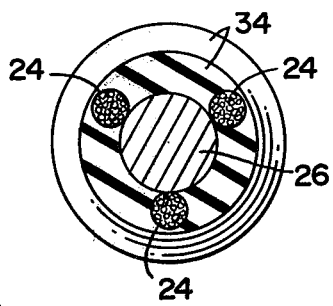
FIG. 4 is a sectional view taken along line 4—4 of FIG. 2.
Figure 3:
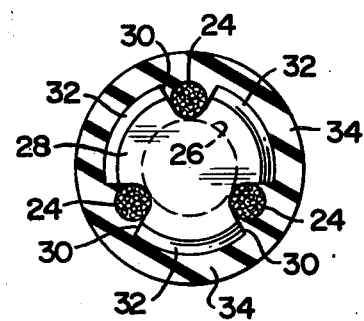
FIG. 3 is a sectional view taken along line 3—3 of FIG. 2.
Figure 5:
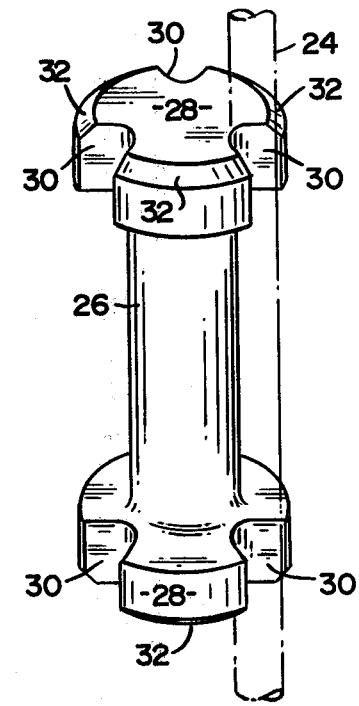
FIG. 5 is a perspective view of the handhold body shown in FIG. 2.

In the partially sectional view of FIG. 2, a preferred embodiment for the construction of handhold 20 can be seen. Handhold 20 comprises an elongate body means including a central shaft 26 and oppositely disposed flange means 28 extending radially from each end of shaft 26. A plurality of groove means comprising notches 30 are formed in each of the flange means 28 and are uniformly spaced therein around the circumference of each of the flange means 28. As best seen in the sectional view of FIG. 3, each of the notches 30 are of a width and depth substantially equal to the diameter of a rope strand 24 so that each individual strand 24 can be received firmly within a corresponding notch 30. It should also be noted that outer edges 32 of flange means 28 are beveled, or rounded, to facilitate insertion of the body means within rope 22. As illustrated in the views of FIGS. 2 and 5, notches 30 are axially aligned with regard to each other so that strands 24 may be inserted therein in a parallel fashion as shown in FIG. 5, or in a substantially helical fashion as shown in FIG. 2. It is to be understood that the helical arrangement shown in FIG. 2 is preferred in that this enables strands 24 to follow their natural curvature.

Though not absolutely necessary, handhold 20 of this invention may further comprise a covering, or handgrip, 34 disposed in substantially surrounding relationship to that segment of rope 22 having a handhold body inserted therein. Handgrip 34 may be formed of any suitable materials such as, for example, rubber, and may be molded or shrunk into position.

As shown in the view of FIG. 2, it can be seen that handgrip 34 will tend to "seal" rope 22 at the top and bottom of the handhold body. However, it is to be understood that such a "seal" is not necessary to the operability of the present invention. That is to say, it is not required that the rope 22 be whipped or otherwise secured at each end of shaft 26. Rather, by virtue of the construction of the handhold body, and particularly the flange means 28, each of the strands 24 of rope 22 will tend to coil naturally without the necessity of using any external securing device or means.

Figure 6:
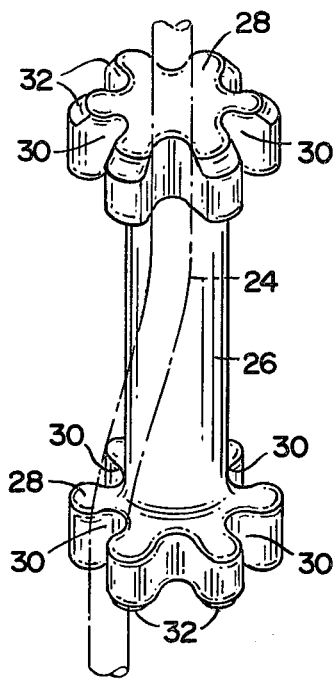
FIG. 6 is a perspective view similar to that of FIG. 5 showing yet another embodiment for the handhold body.

With particular reference to the view of FIG. 6, it is to be understood that the number of notches 30 need not correspond exactly to the number of strands 24 comprising rope 22. However, if there are more notches 30 than strands 24, it is preferred that the number of notches 30 be a whole multiple of the number of strands 24. This is preferred so that the strands 24 may be spaced uniformly around the circumference of flanges 28 within notches 30. This second structural embodiment is shown in the view of FIG. 6 as comprising six notches 30 formed in each of the flange means 28 so as to accommodate a three strand rope. Actual experimentation with the embodiment of FIG. 6 reveals that the handhold body can more easily be inserted within the open strands 24 of a rope 22 when the number of notches 30 is a multiple of the number of strands 24. It is believed that this is the case because individual strands 24 can more easily locate a corresponding notch 30 for seating therein.

Figure 7:
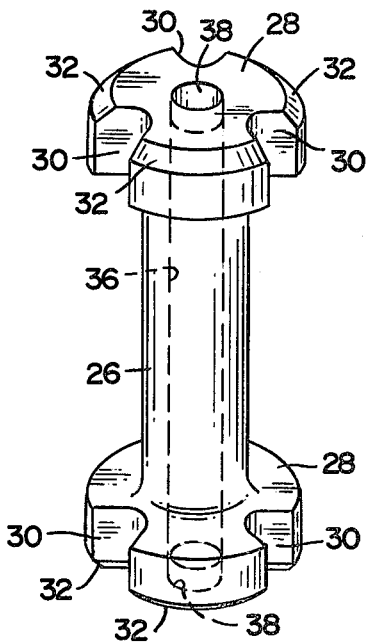
FIG. 7 is a perspective view similar to that of FIG. 5 showing yet another embodiment for the handhold body.
Figure 11:
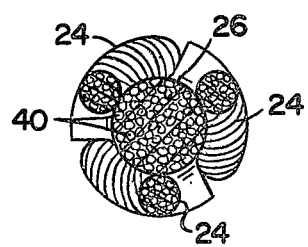
FIG. 11 is a sectional view similar to that of FIG. 4 with the covering removed and showing a modification of the handhold body.

Further structural embodiments of handhold 20 are suggested in the remaining drawing figures. For example, FIG. 7 illustrates a handhold 20 wherein central shaft 26 comprises a hollow bore 36 formed completely therethrough. Each end of bore 36 may be sealed as by plugs 38, thereby providing a relatively bouyant air pocket. Of course, it would also be possible to place a weight within bore 36 so as to decrease the bouyancy of the handhold body. Yet another embodiment may comprise the formation of central shaft 26 from a material having integral gas or air pockets 40 therein such as, for example, expanded plastic, as shown in the sectional view of FIG. 11.

Figure 8:
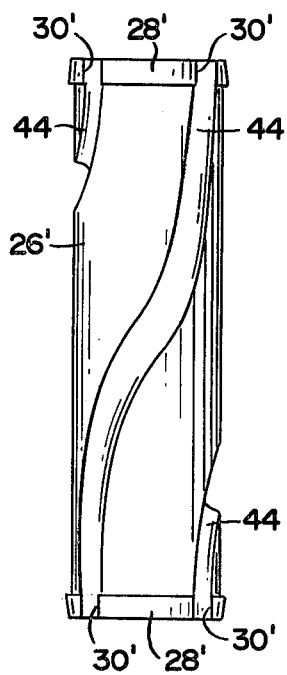
FIG. 8 is an elevational view of still another embodiment for the handhold body.
Figure 9:
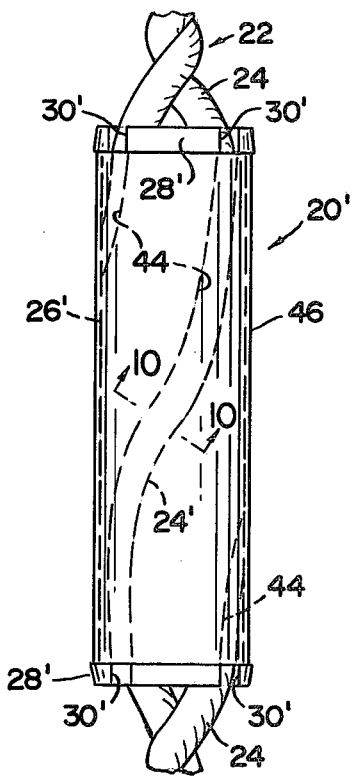
FIG. 9 is an elevational view of the handhold body shown in FIG. 8, but secured within a rope.
Figure 10:
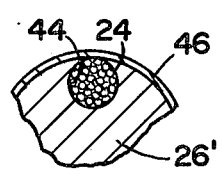
FIG. 10 is a fragmentary sectional view taken along line 10—10 of FIG. 9.

Yet another embodiment for handhold 20 is shown in the views of FIGS. 8, 9 and 10. For clarity this embodiment has been designated generally by reference numeral 20 prime. Handhold 20 prime comprises a central shaft 26 prime. Flange means 28 prime are disposed adjacent each of the ends of shaft 26 prime and define a bevel. As with the preferred embodiment of FIG. 2, this embodiment 20 prime also comprises a plurality of notches 30 prime formed in each of the flange means 28 prime. A corresponding number of grooves 44, each of the grooves 44 comprising a substantially helical curve, is formed on the exterior of central shaft 26 prime for the reception of individual ones of the strands 24 prime therein. Finally, it may be desirable as shown in FIG. 9, to encapsulate this central shaft 26 prime and the individual strands 24 prime disposed therearound by means of a skin 46 formed from a suitable material such as, for example, a rubber or flexible plastic material.

Insertion of the handhold 20 into the rope 22 may be accomplished in at least two ways. First, it is contemplated that the handhold body comprising central shaft 26 and flange means 28 may be inserted within the twisted rope 22 automatically at its point of manufacture. This would, of course, be accomplished after the basic twist had been placed in the rope. Second, a handhold body may be easily inserted into an existing rope by the user simply by untwisting, or kinking a segment of the twisted rope 22. Then, when the handhold body is placed within the opened strands 24 and the user releases those strands, the rope will naturally twist back thereby locking in the handhold body.

It will thus be seen that the objects set forth above, among those made apparent from the preceding description, are efficiently attained and since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A handhold of the type primarily intended for use in combination with a twisted rope, said handhold comprising: a substantially elongate body means comprising a central shaft and oppositely disposed flange means extending radially from each end of said shaft, whereby said central shaft defines a relieved portion of said body means; and a plurality of groove means comprising a plurality of notches formed in each of said flange means and being axially aligned with a corresponding one of said notches in the other of said flange means, the number of said plurality of said groove means being at least equal to the number of strands forming the twisted rope, whereby said handhold may be inserted between the separated strands of the rope such that each strand will seat in at least two of said notches to secure said handhold within the rope.

2. A handhold as in claim 1 wherein each of said notches defines a diameter substantially equal to the diameter of a strand forming the twisted rope.

3. A handhold as in claim 1 wherein each one of said plurality of groove means is uniformly spaced from another around the circumference of said body means.

4. A handhold as in claim 3 wherein the number of said plurality of groove means is equal to the number of strands forming the twisted rope.

5. A handhold as in claim 3 wherein the number of said plurality of groove means is a multiple of the number of strands forming the twisted rope.

6. A handhold as in claim 3 wherein each end of said body means is flat and disposed in substantially perpendicular relation to the longitudinal axis of said body means.

7. A handhold as in claim 3 further comprising a longitudinally disposed bore formed along the longitudinal axis of said body means.

8. A rope in combination with a handhold, said combination comprising: a rope defined by a plurality of strands twisted together, a section of said rope of a length approximating the span of the palm of a user's hand being sufficiently untwisted to separate said strands from each other; and a handhold inserted within said separated strands, said handhold comprising an elongated body means of a length approximating the span of the palm of a user's hand and of a circumference to be gripped by the user's hand, said body means comprising a central shaft and oppositely disposed flange means extending radially from each end of said shaft, whereby said central shaft defines a relieved portion of said body means, and a plurality of notches formed in each of said flange means and being axially aligned with a corresponding one of said notches in the other of said flange means, the number of said plurality of said notches in each of said flange means being at least equal to the number of said strands, each one of said strands being seated within at least two of said notches to secure said handhold within said rope.

9. A rope in combination with a handhold as in claim 8 comprising a plurality of said handholds disposed in substantially regular, spaced apart relation one from another along the length of said rope.

10. A rope in combination with a handhold as in claim 8 further comprising means covering said combination.

11. A rope in combination with a handhold as in claim 10 wherein said covering means comprises a handgrip.

* * * * *